Patented July 5, 1949

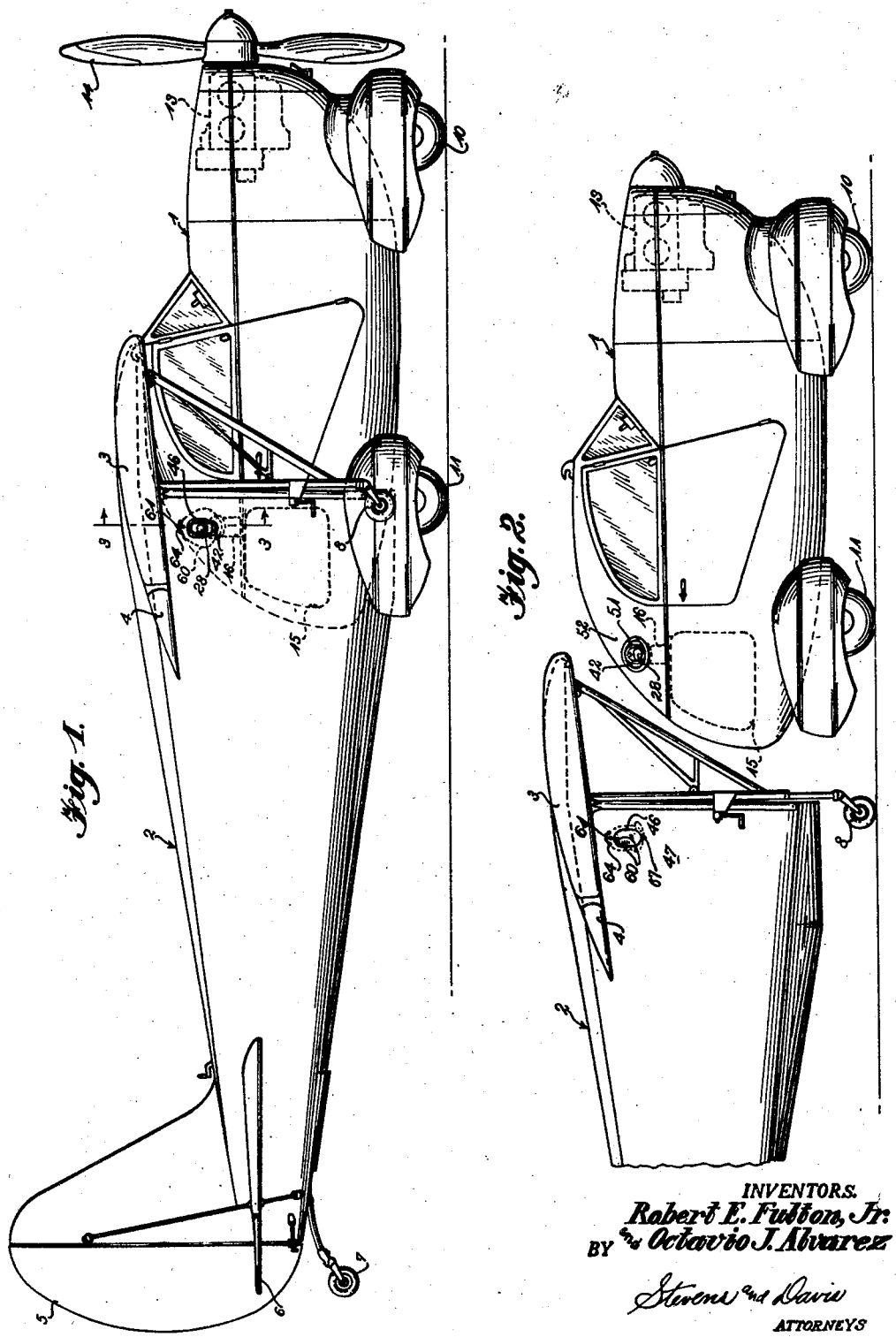

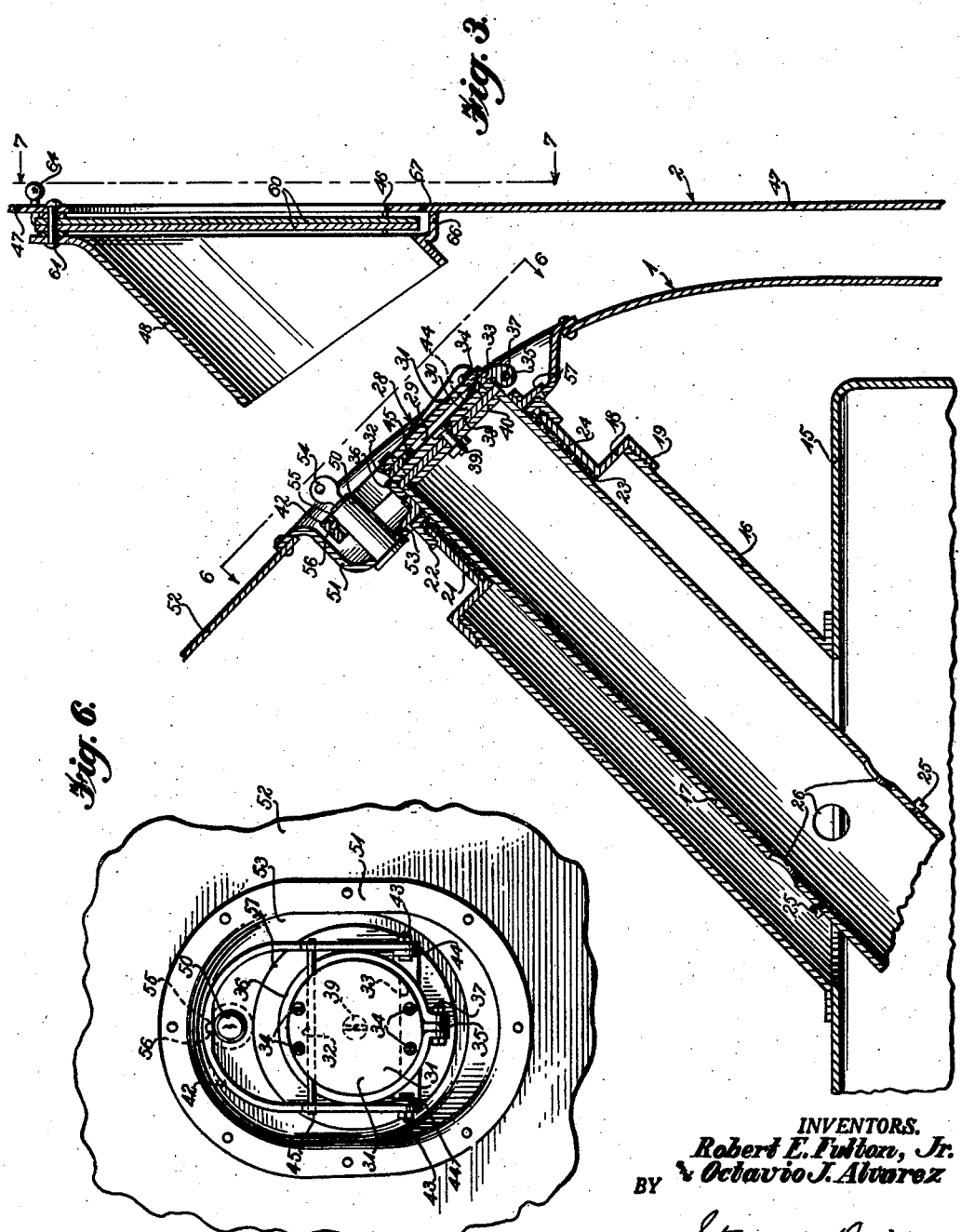

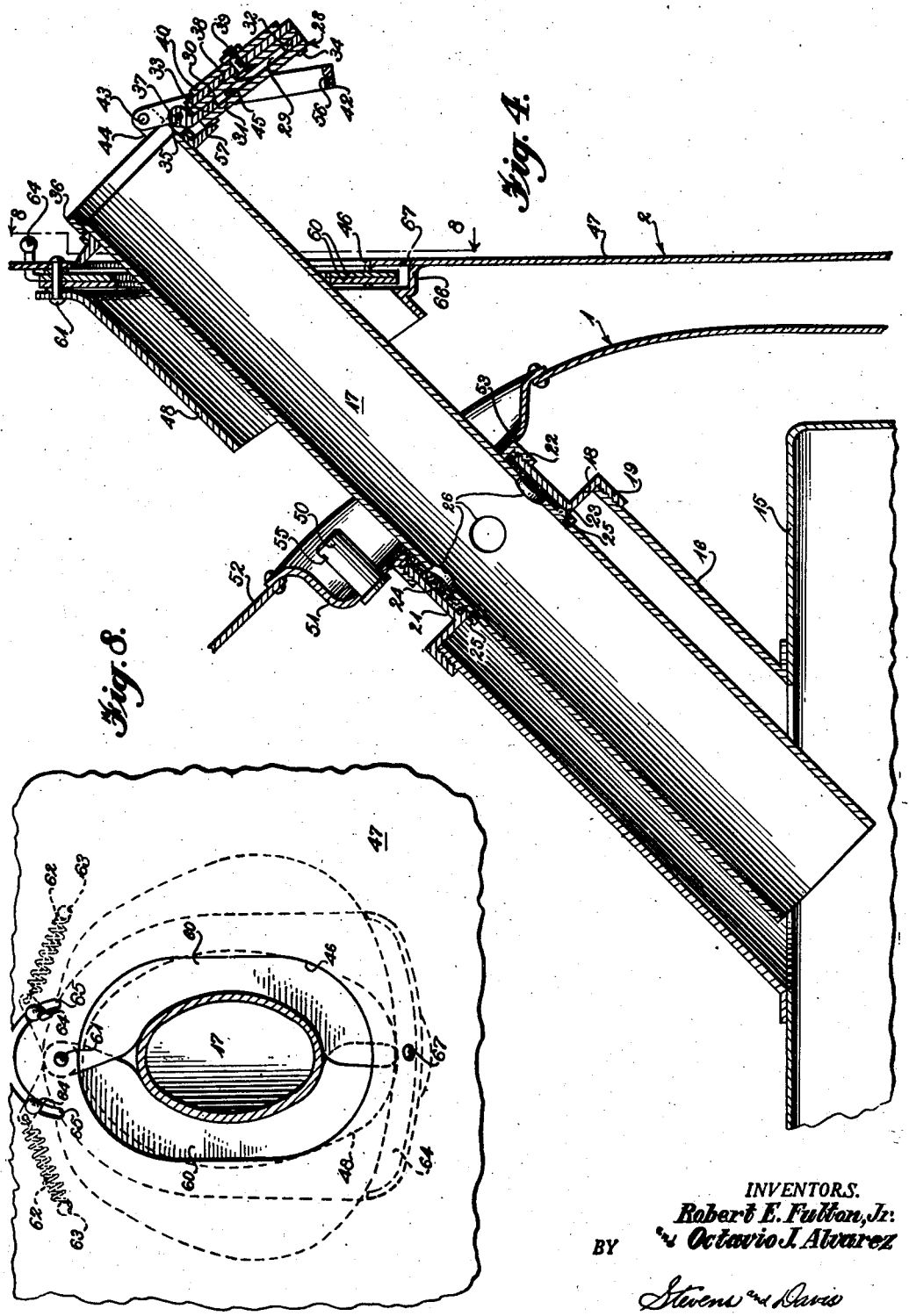

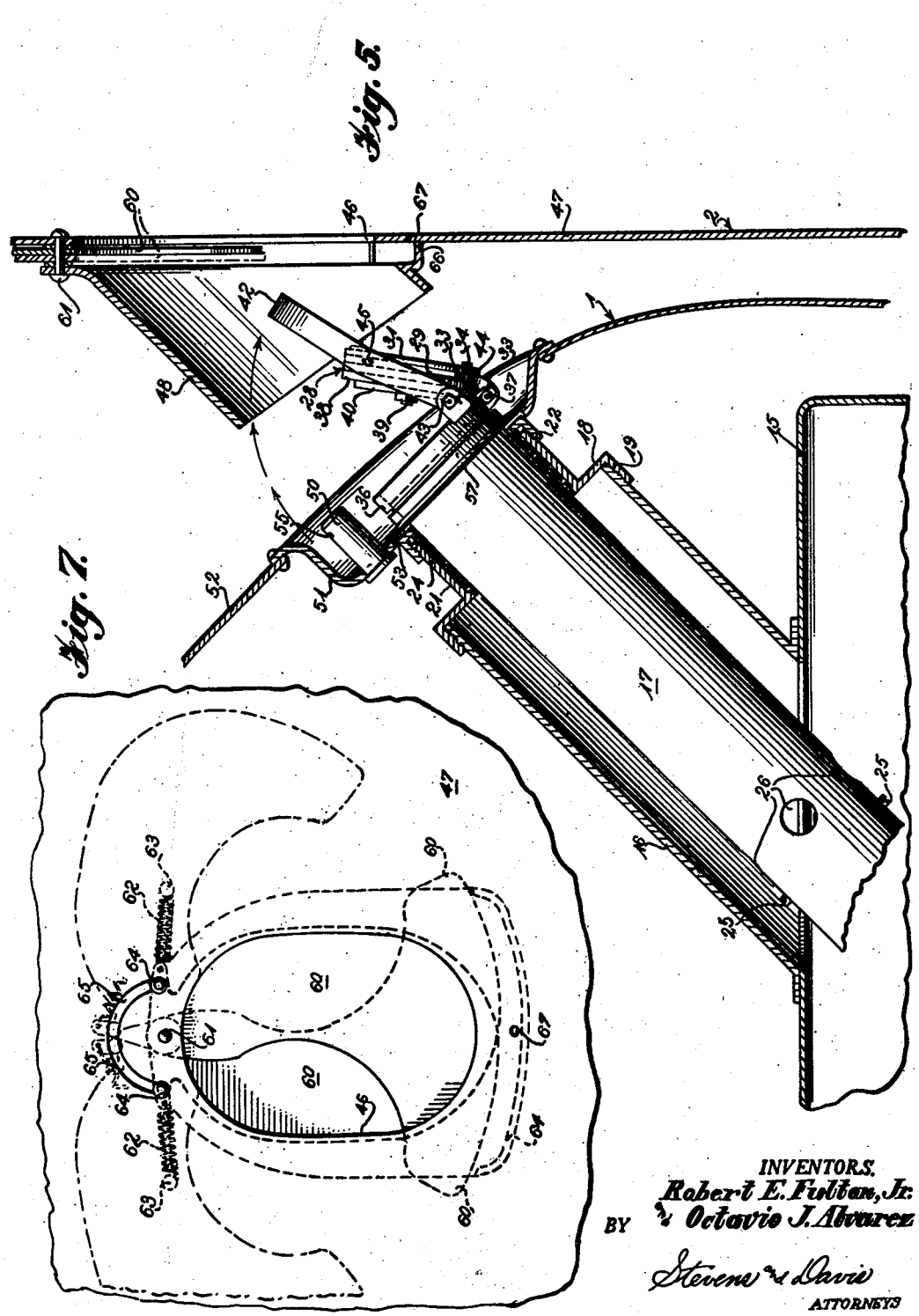

2,474,974

UNITED STATES PATENT OFFICE 2,474,974

FUEL TANK FILLER SPOUT FOR ROADABLE AIRPLANES

Robert E. Fulton, Jr., Washington, D. C., and Octavio Jose Alvarez, New York, N. Y., assignors to Continental, Incorporated, Washington, D. C., a corporation of Connecticut Application August 25, 1945, Serial No. 612,640

8 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by a combination of already familiar elements.

The present invention therefore is concerned with an airplane having a removable section adapted for use as a standard automobile and an airplane section comprised of wings, fuselage and flight control surfaces, and having cooperating interlocking means on the airplane and automobile sections by which the sections may be firmly held together to establish a complete airplane. The engine which drives the automobile section for road travel and which drives the completed airplane for air travel is located in the automobile section. The fuel tank for this engine must also therefore be carried by the automobile section.

In selecting an appropriate place in the automobile section for the fuel tank attention must be given to the fact that for economy of space it is best located at the rear of the automobile section, as in conventional automobiles. This, however, presents a problem with the present structure, as it is intended that the rearward part of the automobile section enter telescopically into the forward part of the airplane section. As the fuel tank therefor lies within the airplane section when the sections are combined for flight, the fuel spout must be so arranged that during this time the fuel tank can readily and safely be filled.

Another important requirement for the filling spout is that it be so arranged that fuel cannot be spilled within the interior of either the automobile or airplane section. If any fuel should become spilled within the interior of the vehicle, it would present a fire hazard. Moreover, regulations require that the end of the fuel spout should be disposed on the exterior of the automobile section so that fuel vapor cannot escape into the compartment occupied by the passengers. For example, the fuel spout could be located within the cabin of the vehicle and the tank could be filled by bringing the supply hose in through a window or door, but gasoline might then be spilled into the passenger space and vapors would escape from the spout. The fuel spout of the present invention makes it impossible for either the fuel or its vapors to come into the interior of the vehicle and particularly the automobile section.

It has been noted that the fuel tank, because of its location at the rearward portion of the automobile section, is disposed telescopically within the airplane section when the two sections are combined. It is important, however, that the fuel tank be fillable without requiring separation of the two sections. The invention makes it possible to fill the fuel tank when the sections are combined as easily as this is accomplished when the sections are separated.

The fuel spout of the invention includes a withdrawable portion so that the fuel spout is extensible. When the automobile and airplane sections are combined, this withdrawable portion is brought outwardly through an opening in the side of the airplane section. Such an extensible fuel spout ordinarily would result in the spillage of the gasoline in the withdrawable portion when that portion is moved inwardly to its collapsed position. With the present construction, the movement of the withdrawable portion of the fuel spout to its collapsed position does not result in the spillage of any fuel.

A further feature of the invention is the provision of a combined fuel spout cap and handle. This construction requires that the cap be open when the fuel spout is withdrawn or collapsed and this is important as it prevents the creation of either a vacuum or a pressure within the tank when the withdrawable portion is withdrawn or collapsed.

A further feature of the invention is the provision of means by which the cap may be locked in position so that the fuel tank may not be tampered with and its contents be withdrawn through the fuel spout.

Other features of the invention will appear from the following description when considered with the accompanying drawings.

In the drawings:

Figure 1 is a side elevation of the airplane as it appears when the automobile and airplane sections are assembled for flight, certain structural elements associated with the invention being generally represented by dotted lines;

Figure 2 shows the automobile section removed from the airplane section and the airplane section in its self-sustaining position;

Figure 3 is a section on the line 3—3 of Figure 1 on an enlarged scale;

Figure 4 is a section similar to Figure 3, but showing the fuel spout in its extended position and in its relation to the side wall of the airplane section;

Figure 5 is similar to Figure 3 but showing the fuel spout about to be withdrawn;

Figure 6 is a view on the line 6—6 of Figure 3;

Figure 7 is a view on the line 7—7 of Figure 3; and

Figure 8 is a view on the line 8—8 of Figure 4.

The roadable airplane to which the invention is here shown applied, is of the character generally represented in application Serial No. 580,842, filed March 3, 1945 now Patent No. 2,430,869, issued November 18, 1947. However, it will be understood that the invention is not to be limited in this respect as it may be applied to other instances in which an extensible fuel spout is called for.

Referring first to Figure 1, the automobile section 1 of the airplane appears at the right of the vehicle and the airplane section 2 appears at the left of the vehicle. In Figure 1 these two sections are combined for flight and in Figure 2 they are separated from each other so that the automobile section may be driven independently as a unit for road travel. When the automobile section is used as a unit the airplane section 2 is left behind.

The airplane section 2 includes lifting wings 3 at its forward portion and at the trailing edges of these wings are the usual ailerons 4. At the rear of the airplane section are the usual control surfaces and these include the rudder 5 and the elevators 6. Beneath these tail surfaces is a landing wheel 7.

When the airplane section is attached to the automobile section as shown in Figure 1, the airplane section is supported as a cantilever as shown in Figure 1. The means for attaching these sections together and by which the sections may be released from each other constitute no part of the present invention and consequently are not shown in detail. A suitable means is disclosed in application Serial No. 580,844, filed on March 3, 1945. When this interconnecting means is released and the sections are separated from each other, the airplane section must be self-supporting and to accomplish this it is provided with wheels 8 beneath the forward wings.

Just prior to the time that the airplane section is separated from the automobile section, the wheels 8 and the landing wheel 7 are moved downwardly into contact with the ground. The means by which the wheels 7 and 8 are moved downwardly are not a part of the present invention and therefore are not here described in detail, but suitable means is disclosed in application Serial No. 580,843, filed March 3, 1945. These wheels 7 and 8 support the airplane section in the same position which it would occupy if it were attached to the automobile section so that separation of the sections and their reconnection is facilitated.

The automobile section 1 includes the front wheels 10 and the rear wheels 11. It also includes a motor 13 to which the propeller 14 may be attached for air travel as shown in Figure 1, or from which it may be removed for road travel as shown in Figure 2. Suitable detachment means is shown and claimed in application Serial No. 601,242, filed June 23, 1945. The fuel tank 15 for supplying motor 13 with fuel, is supported in the rearward portion of the automobile section in any suitable manner. It will be observed that tank 15 is behind the passengers.

The tank 15 is provided with a neck 16 which extends upwardly from an end of the tank close to the side of the automobile section. The withdrawable portion of the fuel spout is a tube 17 which can be collapsed into neck 16 as shown in Figure 3, or can be withdrawn as shown in Figure 4.

To establish both a guide and a seal for the withdrawable tube 17, a packing gland 18 is located at the upper end of neck 16. This packing gland 18 includes an enlarged cylindrical portion 19 which is affixed to the neck 16 as by being screw-threaded thereon. Gland 18 also includes a sleeve 21 of smaller diameter but which is spaced from the tube 17.

The outer end of sleeve 21 is threaded to receive a clamping ring 22 and at the inner end of sleeve 21 is an inwardly projecting flange 23. The inner edges of flange 23 and ring 22 lie close to the tube 17 and in the space between them is a gasket 24. By tightening clamping ring 22, the gasket 24 may be compressed to establish a tighter seal on the outside of tube 17.

To limit the extent to which the tube 17 may be withdrawn, a stop is provided on the tube 17 and as here shown this is formed by screws 25 threaded into the tube. Slightly outwardly from stop screws 25, openings 26 are formed through the tube 17 and these are positioned to lie within the gasket 24 as shown in Figure 4 when the tube is fully withdrawn and stops 25 strike against gland 18.

Openings 26 in tube 17 serve the important purpose of permitting the fuel in tube 17 to drain into the tank 15 when the tube 17 is collapsed, in the event that the fuel is supplied until it fills or nearly fills tube 17 when this tube 17 is in its withdrawn position. Thus, if the openings 26 were not present, and if the tube 17 were fully withdrawn, the fuel could be supplied until it filled the tube 17. If such a tube were thereafter to be collapsed into neck 16, the fuel in the upper portion of tube 17 would be forced out and would spill.

With openings 26 in tube 17, however, this spillage does not occur, as the movement of tube 17 to collapsed position brings the openings 26 into open communication with the interior of neck 16 and the upper part of the neck 16 is then vented so that the fuel can then rise up into the neck. The fuel in tube 17 consequently runs down in the tank through openings 26 or the bottom open end of the tube. It is therefore important that the space within neck 16 be of greater volume than the portion of tube 17 above the neck, so that there will be ample space in neck 16 to receive the fuel from tube 17 when it is collapsed.

When the tube 17 is fully withdrawn, the openings 26 are closed by the gasket 24 and all of the fuel must run into the tank out of the lower end of the tube. Thus, during the filling operation fuel cannot enter the space in neck 16 and this is true even though fuel is supplied until it is to the top of the withdrawn tube 17. That is, the lower end of the tube will act to seal off the escape of air when the fuel rises to the lower end of the tube 17 and the fuel cannot rise into the neck 16.

To close the upper end of tube 17, a cover or cap 28 is provided. Cap 28 is formed with a slot 29 therethrough and this structure is made up as here shown by two disc plates 30 and 31 held apart by spacer blocks 32 and 33, at diametrically opposite points. Screws 34 hold this assembly together.

One of the spacer blocks, here shown as 33, has a lug 35 depending therefrom to pivotally mount the cap 28. Lug 35 is located between the ends of a clamp ring 36 and a bolt 37 passes through these ends to clamp the ring 36 tightly on the end of tube 17. The bolt 37 also serves as a pivot for cap 28.

A sealing gasket 38 is held on the under side of plate 30 of cap 28 to bear on the upper end of tube 17 and tightly close it. This gasket 38 is held in place by a bolt and nut 39, the bolt passing through plate 30 and gasket 38, and also through a holding disc 40. Disc 40 is slightly smaller than the inside of tube 17 and serves to stiffen the central part of gasket 38.

While any means could be provided to manipulate the cap 28, the invention provides means to lock it in sealing position and also to require that the cap be opened before the tube 17 is withdrawn. Also this means requires that the cap 28 be open when tube 17 is being collapsed. It is important that cap 28 be off of tube 17 when the tube is being moved as otherwise a suction would be created within tank 15 when the tube is withdrawn, or a pressure would be created when the tube is collapsed.

This manipulative means includes a bail shaped handle member 42 which is pivoted at its ends by pins 43 to upstanding ears 44 on the clamping ring 36. A cross pin or rod 45 is affixed at its ends to the opposite arms of handle 42 and it passes through the slot 29 through cap 28. The handle 42 therefore acts as a lever to move the cap 28 to closed or open position. Pivot pins 43 should be parallel to bolt 37 and rod 45 should be parallel to them, and it is advantageous to have pivot pins 43 located close to the bolt 37. As here shown the pivot at 37 for cap 28 is at the side of the fuel spout and the pivot at 43 for the handle 42 is slightly inwardly from the side of the fuel spout.

When the handle 42 is drawn away from tube 17, it serves to lift cap 28 off of tube 17 through the action of rod 45. The handle 42 then serves as a handle to withdraw the tube 17 from neck 16 and it may be pulled outwardly through a registering opening 46 in the side wall 47 of the fuselage of the airplane section. The tube 17 cannot, however, be withdrawn through opening 46 unless the handle 42 is in its extended position and cap 28 is open, due to the provision of a guard sleeve 48.

Guard sleeve 48 is secured to the inner side of wall 47, in line with the movement of tube 17 as it is withdrawn. Sleeve 48 is small enough in diameter so that it will be struck by handle 42 if the handle is in its downward position in which it holds cap 28 on the tube 17. In order to withdraw the tube 17, therefore, the handle 42 must be pulled to its outer position as it can then be withdrawn through sleeve 48 as is shown in Figure 5. This requires that cap 28 be off of the tube 17 both when the tube 17 is being withdrawn and being collapsed.

To lock the cap 28 onto the tube 17 in closed position, a lock 50 is affixed to a dished plate 51 affixed to the side wall 52 of the automobile section. There is an opening 53 through plate 51 for the passage of tube 17. The lock 50 is affixed to plate 51 in such position that it extends upwardly inside of handle 42. The barrel of lock 50 is turned by a removable key 54, and this causes a bolt 55 of the lock to move into or out of a groove 56 in the handle 42. When bolt 55 is retracted handle 42 can be lifted to move cap 28 to its open position.

When the tube 17 is in its collapsed position, its upper end and the cap 28 and handle 42 lie within the dished plate 51 and therefore do not extend beyond the general outer surface of the automobile section. These parts are therefore protected and a good appearance is made. A gasket 57 carried on the tube 17 bears against plate 51 around opening 53 to seal this opening when the tube is collapsed.

When tube 17 is not projecting through opening 46 in wall 47 of the airplane section, this opening should be closed. The invention here contemplates the use of a pair of shutters 60 pivoted upon a pin 61 carried by the wall 47 and also by the upper end of shield 48. These shutters are urged to closed position by means of springs 62 attached to them and extending to anchoring pins 63 on the fuselage. To manually open the shutters 60, posts 64 are affixed to them and these posts extend to the outer side of the side wall 47 through arcuate slots 65. When these posts are pinched together the shutters separate.

It is intended that the inner edges of shutters 60 be so shaped as shown in Figure 8, that they tightly fit around tube 17 to thereby prevent the passage of liquid downwardly along the tube. To catch any fuel caught by shutters 60 and which drips off of the shutters, a channel or pocket 66 is formed on the inside of wall 47 around the opening 46 and the shutters extend downwardly into this channel or pocket. Any fuel which enters channel 66 is carried to the outside through opening 67 in wall 47. Gasket or drip flange 57 also serves to catch any spillage and causes it to drop off of tube 17 instead of running down along the tube, as appears from Figure 6.

When the automobile section is being used alone for road travel as shown to the right in Figure 2, the tube 17 need not be withdrawn in order to supply the tank with fuel. It is merely necessary to unlock the handle 42 and swing it away from the spout to thereby lift the cap 28. Fuel can then be supplied to fill the tank because the openings 26 vent the upper part of the tank as is apparent from Figure 3 or Figure 5.

When the automobile section is combined with the airplane section to form a complete airplane for flight as in Figure 1, the fuel tank can easily be filled by pinching the posts 64 together with one hand and reaching through opening 46 to unlock the handle 42. Handle 42 can then be lifted as shown in Figure 5 and this necessarily unseats the cap 28. The tube 17 can then be withdrawn to the position of Figure 4 by using the handle 42 as a handle. After filling the tank, the tube 17 is collapsed and handle 42 is urged downwardly until it seats cap 28 and is locked by lock 50.

As has been noted, the tank can be filled to the top of tube 17 when this tube is withdrawn. When the tube 17 is thereafter collapsed, openings 26 vent the neck 16 so that the fuel in tube 17 runs down in the tank and up in neck 16 and is not spilled out of the tube. While the provision of neck 16 is preferable as it makes it possible to fill the tank and make use of its full storage capacity, the neck 16 may be omitted. If neck 16 is omitted, the fuel will not rise in the tank above the lower open end of the withdrawable tube as the space thereabove will be sealed off as is the neck 16 in Figure 8.

What is claimed is:

1. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within the forward portion of the fuselage when the sections are combined, and a filling spout projecting from the tank and including a fixed portion connected to the tank and a movable portion withdrawable from the fixed portion, said fuselage having an opening therethrough in alignment with said spout through which said withdrawable portion projects when it is in its extended position.

2. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within the forward portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, and a closure for said fuselage opening comprising a plurality of elements movable to separated position to receive said withdrawable portion between them, the inner surfaces of said elements being shaped to closely engage said withdrawable portion as a seal.

3. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within the forward portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, and a closure for said fuselage opening comprising a plurality of pivotably mounted leaves movable to a closed position and also to a separated position to receive said withdrawable portion, the opening defined by said leaves when in the separated position closely conforming to the exterior of the withdrawable portion to constitute a seal therewith.

4. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within the forward portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, and a closure for said fuselage opening comprising a plurality of elements movable to separated position to receive said withdrawable portion between them, the inner surfaces of said elements being shaped to closely engage said withdrawable portion as a seal, said fuselage having a portion forming a pocket beneath said closure to receive spilled fuel.

5. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within a portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, and a drip flange carried by the withdrawable portion to lie exteriorly of the fuselage when in its extended position.

6. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within the forward portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, a cap for said fuel spout, and a handle pivotally attached to the withdrawable fuel spout portion and having a connection with said cap to cause removal of the cap when the handle is moved to a position in line with the spout to withdraw it.

7. A roadable airplane including an automobile section and an airplane section combinable therewith to form a complete airplane, said airplane section comprising a fuselage, and said automobile section comprising a fuel tank and a body portion enclosing the fuel tank, said body portion lying telescopically within a portion of the fuselage when the sections are combined, a filling spout projecting from the tank and including a fixed portion connected to the tank and a movable portion withdrawable from the fixed portion, said fuselage having an opening therethrough in alignment with said spout through which said withdrawable portion projects when it is in its extended position, a cap for said fuel spout, a handle pivotally attached to the withdrawable fuel spout portion and having a connection with said cap to cause removal of the cap when the handle is moved to a position in line with the spout to withdraw it, and a guard carried by the inner side of the fuselage to be contacted by the handle and prohibiting outward movement of the withdrawable fuel spout unless the handle has been lifted to unseat the valve.

8. A roadable airplane including an automobile section and an airplane section combinable therewith to form a complete airplane, said airplane section comprising a fuselage and said automobile section comprising a fuel tank and a body portion enclosing the fuel tank, said body portion lying telescopically within a portion of the fuselage when the sections are combined, and a filling spout projecting from the tank and including a neck portion connected to the tank and a withdrawable portion telescopic within the neck portion, said withdrawable portion being of a length to extend downwardly within the neck portion when the withdrawable portion is in its outer position to seal the neck portion against the use of fuel therein, and means for venting the neck portion when the withdrawable portion is urged to retracted position to permit the rise of fuel therein from the withdrawable portion, said fuseage having an opening therethrough in alignment with said spout through which said withdrawable portion projects when in its extended position.

ROBERT E. FULTON, JR.
OCTAVIO JOSE ALVAREZ.

REFERENCES CITED

The following references are of record in the file of this patent:

UNITED STATES PATENTS

| Number | Name | Date |
|---|---|---|
| 2,144,292 | Holby | Jan. 17, 1939 |
| 2,215,003 | Johnson | Sept. 15, 1940 |